United States Patent
Ludlow, III

(10) Patent No.: US 7,816,450 B2
(45) Date of Patent: Oct. 19, 2010

(54) TRANSPARENT THERMOPLASTIC BLEND OF A CYCLOOLEFIN COPOLYMER AND A THERMOPLASTIC POLYURETHANE

(75) Inventor: James M. Ludlow, III, Sagamore Hills, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 0 days.

(21) Appl. No.: 12/361,850

(22) Filed: Jan. 29, 2009

(65) Prior Publication Data

US 2009/0143533 A1    Jun. 4, 2009

Related U.S. Application Data

(62) Division of application No. 10/948,978, filed on Sep. 24, 2004.

(60) Provisional application No. 60/506,426, filed on Sep. 26, 2003.

(51) Int. Cl.
  C08L 75/00    (2006.01)
  C08L 75/08    (2006.01)
  C08L 45/00    (2006.01)
  C08L 23/00    (2006.01)

(52) U.S. Cl. .................. 525/130; 525/92 A; 525/92 C; 525/125

(58) Field of Classification Search .................. None
See application file for complete search history.

(56) References Cited

U.S. PATENT DOCUMENTS

| | | | |
|---|---|---|---|
| 4,302,558 A | 11/1981 | Ohya et al. | |
| 4,332,919 A | 6/1982 | Kobayashi et al. | |
| 4,384,078 A | 5/1983 | Ohya et al. | |
| 5,393,843 A | 2/1995 | Handlin, Jr. et al. | |
| 5,405,911 A | 4/1995 | Handlin, Jr. et al. | |
| 5,561,208 A | 10/1996 | Takahashi et al. | |
| 5,574,104 A | 11/1996 | Kolycheck et al. | |
| 5,614,589 A | 3/1997 | Niznik et al. | |
| 5,869,586 A | 2/1999 | Riedel et al. | |
| 6,040,382 A | 3/2000 | Hanes | |
| 6,054,533 A | 4/2000 | Farkas et al. | |
| 6,140,405 A | 10/2000 | Eckstein et al. | |
| 6,225,407 B1 | 5/2001 | Jacobs et al. | |
| 6,316,560 B1 | 11/2001 | Jacobs et al. | |
| 6,379,004 B1 | 4/2002 | Walther et al. | |
| 2002/0132920 A1* | 9/2002 | Willems et al. | 525/88 |

FOREIGN PATENT DOCUMENTS

| DE | 19652340 A1 | 6/1998 |
|---|---|---|
| EP | 0227004 B1 | 4/1990 |
| WO | WO 00/63293 * | 10/2000 |

OTHER PUBLICATIONS

TOPAS Product data sheet.
Ultracki, Polymer Blends Handbook, vol. 2, 2002, p. 930.

* cited by examiner

*Primary Examiner*—David Buttner
(74) *Attorney, Agent, or Firm*—Joe A. Powell

(57) ABSTRACT

A blend of a cycloolefin copolymer and a thermoplastic urethane having similar indices of refraction is transparent. The cycloolefin copolymer is derived from norbornene and other monomers such that it has a processing range compatible with the thermoplastic urethane. The urethane component preferably has a polyether intermediate. A thermoplastic urethane compatibilizing agent is utilized desirably having a hydrocarbon intermediate portion. The compositions can be made to have desirable electrical dissipative properties for static control applications.

17 Claims, No Drawings

TRANSPARENT THERMOPLASTIC BLEND OF A CYCLOOLEFIN COPOLYMER AND A THERMOPLASTIC POLYURETHANE

CROSS REFERENCE TO RELATED APPLICATION

This application is a division of U.S. patent application Ser. No. 10/948,978 filed on Sep. 24, 2004 which claims priority from U.S. Provisional Application Ser. No. 60/506,426 filed on Sep. 26, 2003.

FIELD OF INVENTION

The present invention relates to a transparent blend of a thermoplastic elastomer such as a polyurethane based inherently dissipative polymer (TPU-IDP), a cycloolefin copolymer, and desirably a compatibilizing agent. More specifically, the present invention relates to a clear blend wherein the indices of refraction of the thermoplastic polyurethane and the cycloolefin are similar. The present invention also relates to blends of thermoplastic polyurethanes (TPU) and cycloolefin copolymer which are not transparent and to other inherently dissipative polymers and cycloolefin copolymers.

BACKGROUND OF THE INVENTION

Inherently dissipative polymers (IDPs) are a class of polyether elastomers which have inherent volume resistivity in the $1 \times 10^5$ to $1 \times 10^{12}$ ohm-cm. Examples include polyethylene oxide-based polyether urethanes, polyether amides and polyether esters, and copolymers of ethylene oxide such as ethylene oxide/propylene oxide or ethylene oxide/epichlorohydrin. IDPs are used in alloys with other thermoplastics as a means to impart a level of conductivity sufficient to render the plastics static dissipative (surface and volume resistivities in the $1 \times 10^5$ to $1 \times 10^{12}$ range). For example, U.S. Pat. No. 5,574,104 relates to polymer compositions comprising a polyether polyurethane IDP which can be blended with one or more base polymers. The subject blends have useful static dissipative properties and exceptional cleanliness, making them suitable for handling of sensitive electronic components and devices. However, the blends are generally not transparent.

U.S. Pat. No. 6,140,405 relates to a low molecular weight polyether oligomer which is modified with a salt, preferably containing lithium, during a chain extension reaction of the polyether oligomer to form IDP products such as polyurethanes, polyether amide block copolymers and polyetherester block copolymers. The reaction product polymers exhibit lower surface and volume resistivities and static decay times, relative to other IDPs, yet are free of excessive amounts of extractable anions, particularly chlorine, nitrate, phosphate and sulfate.

U.S. Pat. Nos. 4,332,919, 4,302,558 and 4,384,078 describe inherently dissipative acrylic polymers made by a core/shell process. This class of IDP polymers is transparent, but suffers from high resistivity, slow static decay times and high off-gassing of volatile impurities, making it less desirable for sensitive electronic handling applications.

U.S. Pat. No. 6,225,407 relates to a polymer blend comprising one or more cycloolefin copolymers and one or more types of core-shell particles or one or more copolymers which are composed to some extent of rubbers with low glass transition temperatures, or a combination of one or more types of core-shell particles and of one or more copolymers which are composed to some extent of rubbers with low glass transition temperatures.

U.S. Pat. No. 6,054,533 relates to a compatibilized blend of a thermoplastic elastomer and a polyolefin. The compatibilizer is a thermoplastic polyurethane formed by the reaction of a substantially hydrocarbon intermediate such as a polybutadiene polyol, a diisocyanate such as MDI, and an amine or diol chain extender such as neopentyl glycol. The compatibilizer has high amounts of soft segments therein and imparts improved properties to blends of a thermoplastic elastomer and polyolefin such as good impact resistance, good tensile strength, good tear resistance, and good delamination resistance. These compositions are not transparent.

SUMMARY OF THE INVENTION

Transparent thermoplastic blends are formed from a thermoplastic urethane and a cycloolefin copolymer such as norbornene-ethylene. The thermoplastic urethane desirably has a polyether intermediate and the cycloolefin copolymer has a processing temperature range which is compatible with the thermoplastic urethane. The norbornene-ethylene copolymers generally contain at least about 50 mole % ethylene and have a Tg of less than about 150° C. The indices of refraction of both components are similar so that a transparent blend is produced which can be utilized in various applications requiring transparency such as in electronic and semi-conductor packaging, clean room components and articles, hard disc drive components and packaging, optical devices and films, and the like. A compatibilizing agent desirably is also utilized which can be a thermoplastic polyurethane having a hydrocarbon intermediate.

Blends of cycloolefin copolymers and thermoplastic polyurethanes (TPU) are also provided which have excellent physical properties and can be made to have electrical dissipative properties by the selection of the TPU. The cycloolefin copolymers are also blended with other inherently dissipative polymers (non-TPU) to give electrical dissipative properties. Examples of other IDP polymers which are blended with the cycloolefin copolymers include polyether amides, polyether esters, copolymers of ethylene oxide and propylene oxide, and copolymers of ethylene oxide and epichlorohydrin.

DETAILED DESCRIPTION

The thermoplastic polyurethane (TPU) of the present invention can be conventional TPUs which generally have poor electrostatic dissipating properties or other TPUs which are an inherently dissipative polymer (TPU-IDP).

Conventional TPU

Suitable typical or conventional TPUs which are utilized as a blend polymer are made by reacting a hydroxyl terminated polyester intermediate, or preferably a hydroxyl terminated polyether; at least one polyisocyanate; and one or more chain extenders. The hydroxyl terminated polyester intermediate polymer is generally a linear polyester having a number average molecular weight of from about 300 to about 10,000 and preferably from about 500 to about 5,000. The molecular weight is determined by assay of the terminal functional groups. The polymers are produced by (1) an esterification reaction of one or more glycols with one or more dicarboxylic acids or anhydrides or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups.

A suitable reaction for the formation of a polyester intermediate also includes a ring opening polymerization which can utilize various lactones such as epsilon-caprolactone and can be initiated with a bifunctional initiator such as diethylene glycol.

The dicarboxylic acids of the polyester intermediate can be aliphatic, cycloaliphatic, aromatic, or combinations thereof. Suitable dicarboxylic acids which may be used alone or in mixtures generally have a total of from 4 to about 15 carbon atoms and include: succinic, glutaric, adipic, pimelic, suberic, azelaic, sebacic, dodecanedioic, isophthalic, terephthalic, Cyclohexanoic, and the like. Anhydrides of the above dicarboxylic acids such as phthalic anhydride, tetrahydrophthalic anhydride, or the like, can also be used. Adipic acid is the preferred acid. The glycols which are reacted to form a desirable polyester intermediate can be aliphatic, aromatic, or combinations thereof, and have a total of from 2 to about 12 carbon atoms, and include ethylene glycol, propylene-1,2-glycol, 1,3-propanediol, butylene-1,3-glycol, 1,4-butanediol, 1,5-pentanediol, 1,6-hexanediol, 2,2-dimethylpropane-1,3-diol, 2,2-diethylene-1,3-diol, 1,4-cyclohexanedimethanol, decamethylene glycol, dodecamethylene glycol, and the like. 1,4-butanediol is the preferred glycol.

The preferred polyether polyol intermediates are derived from a diol or polyol having a total of from 2 to 15 carbon atoms, for example, an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, poly(propylene glycol) comprising propylene oxide reacted with propylene glycol, poly(propylene-ethylene glycol) comprising propylene oxide and ethylene oxide reacted with propylene glycol, poly(tetramethylene ether glycol) comprising water reacted with tetrahydrofuran (PTMEG), glycerol adduct comprising glycerol reacted with propylene oxide, trimethylopropane adduct comprising trimethylolpropane reacted with propylene oxide, pentaerythritol adduct comprising pentaerythritol reacted with propylene oxide, and similar hydroxyl functional polyethers. The various polyether intermediates generally have a number average molecular weight, as determined by assay of the terminal functional groups of from about 200 to about 10,000 and preferably from about 500 to about 5,000.

The desired thermoplastic polyurethane (blend polymer) is made from the above-noted intermediate such as a hydroxyl terminated polyester or polyether which is further reacted with a polyisocyanate, preferably a diisocyanate, along with extender glycol. Examples of suitable diisocyanates generally have the formula R(NCO)$_n$ wherein n equals 2, 3, or 4 with 2 being highly preferred. Mixtures of various polyisocyanates can also be utilized and thus need not be an integer. R is an aliphatic, an aromatic, or combinations thereof having a total of from 2 to about 30 carbon atoms with from about 6 or about 8 to about 15 being preferred. Examples of suitable diisocyanates include non-hindered aromatic diisocyanates such as: 4,4'-methylenebis-(phenyl isocyanate) (MDI); isophorone diisocyanate (IPDI), m-xylylene diisocyanate (XDI), toluene diisocyanate, phenylene-1,4-diisocyanate, naphthalene-1,5-diisocyanate, as well as non-hindered cyclic aliphatic diisocyanates such as 1,4-cyclohexyl diisocyanate (CHDI), decane-1,10-diisocyanate, diphenylmethane-3,3'-dimethoxy-4,4'-diisocyanate, dicyclohexylmethane-4,4'-diisocyanate, and cyclohexyl-1,4-diisocyanate. MDI is highly preferred.

Examples of suitable extender glycols (i.e., chain extenders) are lower aliphatic or short chain glycols having from about 2 to about 10 carbon atoms and include for instance ethylene glycol, diethylene glycol, propylene glycol, dipropylene glycol, 1,4-butane diol (highly preferred), 1,6-hexane diol, 1,3-butane diol, 1,5-pentane diol, 1,4-cyclohexanedimethanol, neopentyl glycol, hydroquinone di(hydroxyethyl)ether and 2-methyl-1,3-propanediol. Amine chain extenders are avoided inasmuch as they generally do not result in good properties.

While a two-step reaction can be utilized such as reacting the intermediate with generally an equivalent weight amount of a diisocyanate and subsequently chain extending the same, the one-shot process is preferred. That is, the one or more intermediates, the one or more diisocyanates, and the one or more chain extenders are added to a reaction vessel and heated in the presence of a suitable catalyst to a temperature above about 100° C. and usually above about 125° C. Inasmuch as the reaction is exothermic, the reaction temperature increases to about 200° C. to about 260° C. or about 290° C. wherein the various components react with one another. The catalysts are conventional and include tin catalysts such as stannous octolate, dibutyl tin dilaurate, dibutyl tin dioctate as well as other metal carboxylate compounds. On a mole basis, the amount of extender glycol for each mole of the polyol intermediate is from about 0.1 to about 3.0, desirably from about 0.2 to about 2.0 and preferably from about 0.5 to about 1.5 moles. Inasmuch as amine chain extenders are not desired, the amount thereof is low, for example about 0.5 moles or less, desirably 0.2 moles or less, and preferably 0.1 moles or less and most preferably nil, that is none at all. On a mole basis, the high molecular weight polyurethane polymer produced by the one-shot process comprises from about 0.96 to about 1.04 and preferably from about 0.98 to about 1.02 moles of the diisocyanate for every 1.0 total moles of both the chain extender and the intermediate, e.g., polyester or polyether.

As noted, the preferred intermediate is a polyether, while MDI is the preferred isocyanate and 1,4-butane diol is the preferred chain extender.

The above conventional thermoplastic polyurethanes as well as the below TPU-IDPs are generally clear and have an index of refraction of from about 1.48 to about 1.58, desirably from about 1.50 to about 1.56 and preferably from about 1.52 to about 1.54.

TPU-IDP

Often, as noted above, it is desirable to use a thermoplastic polyurethane based inherently dissipative polymer, TPU-IDP, composition which can contain an electrostatic dissipating agent. The TPU-IDP composition comprises a low molecular weight polyether oligomer having two reactive moieties which is reacted with a non-hindered diisocyanate and also with a chain extender, generally simultaneously, (i.e. a one-shot polymerization process).

The polyether oligomer of the TPU-IDP composition generally is derived from one or more copolymerizable cyclic ether monomers having the formula:

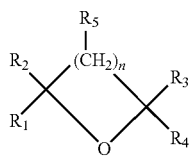

wherein $R_1$, $R_2$, $R_3$, $R_4$, and $R_5$ are independently hydrogen, unsubstituted or substituted alkyl, cycloalkyl, cycloalkenyl, aryl, aralkyl or alkaryl, and wherein the substituents which can be substituted within the foregoing are $OR_6$, $SR_6$, CN or halogens, where $R_6$ is hydrogen, alkyl, cycloalkyl, cycloalkenyl, aryl, aralkyl, alkaryl, or carboxyl, and further wherein the reactive moieties are OH, $NH_2$, or $NHR_6$, and n is 0, 1, 2, or 4. The reaction of the low molecular weight oligomer with a diisocyanate will furnish a polymer having melt indices from 0.05 to 110 grams per ten minutes. The preferred melt index range of the polymer will be from about 1.0 to 65 grams/10 minutes. In general, the melt index is determined according to ASTM D-1238 Procedure A at a barrel temperature of 190° C. and an 8,700 gram piston load.

In a preferred embodiment the low molecular weight oligomer employed is a polymer of cyclic ether monomers having the formula:

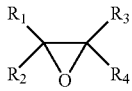

In a more preferred embodiment the low molecular weight oligomer employed is a polymer of cyclic ether monomers wherein $R_1$, $R_2$ and $R_3$ are hydrogen and $R_4$ is H, $CH_3$, or $CH_2X$ wherein X is a halogen, $OR_6$, or $COOR_6$, and $R_6$ is defined herein-above.

The most preferred cyclic ether is ethylene oxide.

In an alternative embodiment the low molecular weight polyether oligomer is end capped with ethylene oxide thereby providing an oligomer which will have two primary moieties.

The alkyl groups of the above cyclic ether formulas can have from 1 to 6 carbon atoms, be straight or branched chain and may be unsubstituted or substituted. The alkenyl groups can have from 1 to 6 carbon atoms, be straight or branched chain, have 1 or 2 double bonds and be unsubstituted or substituted.

The cycloalkyl and cycloalkenyl groups can have from 3 to 8 ring carbon atoms and from 1 to 3 rings. The cycloalkenyl groups can have 1 or 2 double bonds.

The aryl groups can have from 6 to 10 ring carbon atoms and one or two rings.

Useful polyether oligomers are linear polymers having the general formula:

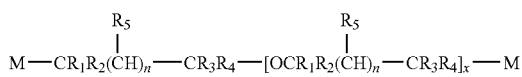

wherein X+1 is the number of repeating ether units, each M is a reactive moiety, n is 0, 1, 2, or 4 and $R_1$, $R_2$, $R_3$, $R_4$ and $R_5$ are as defined hereinabove. The most common M is the OH group. For the subject invention X+1 is at least 4 and between 4 and about 250. On a molecular weight basis, the useful range of polyether oligomers have a number average molecular weight from about 200 to about 10,000 and preferably from about 500 to about 5,000. A highly preferred oligomer is polyethylene glycol. Commercially available polyethylene glycols useful in this invention are typically designated as polyethylene glycol 600, polyethylene glycol 1,450, and polyethylene glycol 4,000.

The polyether oligomer can be a homopolymer or a copolymer of two or more copolymerizable monomers. Some examples of comonomers are ethylene oxide, propylene oxide, 1,2-butylene oxide, epichlorohydrin, allyl glycidyl ether, n-butyl glycidyl ether, glycidyl acrylate, glycidyl methacrylate, 2-ethylhexyl glycidyl ether, tetrahydrofuran, or styrene oxide.

In accordance with the present invention, the low molecular weight polyether oligomer intermediate and the non-hindered diisocyanate are co-reacted simultaneously in a one-shot polymerization process at a temperature above about 100° C. and usually about 120° C., whereupon the reaction is exothermic and the reaction temperature is increased to about 200° C. to about 285° C.

The glycol chain extender can be any diol (i.e., glycol) or combination of diols, containing 2 to 10 carbon atoms, such as ethylene glycol, 1,3-propanediol, propylene glycol, 1,4-butanediol, 1,3-butanediol, 1,5-pentanediol, 1,6-hexanediol, diethylene glycol, 1,4-cyclohexane dimethanol, neopentyl glycol, hydroquinone bis(2-hydroxyethyl)ether, or any aliphatic or aromatic molecule containing two reactive hydroxyl groups. The preferred chain extender is 1,4-butanediol.

The hydroxyl terminated polyols described above can be blended with a glycol chain extender before the blend is reacted with a polyisocyanate or the polyol and the chain extender can be brought to the reaction zone simultaneously. Less desired, the polyol can be reacted with the diisocyanate, and then the prepolymer is reacted with the chain extender. Stabilizers such as antioxidants can be added prior to the reaction or during the reaction.

The amount of glycol chain extender is generally from about 0 or about 0.1 to about 35 moles and desirably from about 0 or about 0.1 to about 20 moles for every mole of low molecular weight polyether oligomer. Generally, the number of moles of diisocyanate per total of the number of moles of the low molecular weight polyether oligomer plus the number of moles of chain extender is from about 0.95 to about 1.06 and preferably from about 0.97 to about 1.03.

In an alternative procedure two or more of the polyether oligomers can be reacted with a diisocyanate to furnish an oligomer dimer or trimer. These dimers or trimers can then be chain extended under similar conditions to form the high molecular weight polymer. This procedure can be used to produce a high molecular weight chain extended polymer with varying polyisocyanate groups.

Conventional diisocyanate or polyisocyanate type components are molecules having two functional groups (reactive sites) which will react with the reactive moieties of the polyethers.

The reactive moieties typically occur at the ends of the polyether oligomers as a result of routine synthesis, however the reactive moieties can be located at locations other than the ends. The reactive moieties most useful for the present invention are OH, $NH_2$ and $NHR_6$. In a preferred form the reactive moieties are OH, $NH_2$ or $NHR_6$ and are on primary carbon atoms. The most preferred reactive moiety is OH.

Any conventional diisocyanate can be used, either aliphatic or aromatic. The polyisocyanates generally have the formula $R(NCO)_n$ wherein n is 2, 3, or 4, or mixtures of polyisocyanates wherein n need not be an integer and preferably is about 2. R is an aliphatic, aromatic, or combinations thereof having a total of from 2 to about 30 carbon atoms with from 6 or about 8 to about 15 carbon atoms being preferred. In a preferred embodiment diisocyanates are utilized. Suitable diisocyanates include, for example, 1,4-diisocyanatobenzene (PPDI), 4,4'-methylenebis(phenyl isocyanate) (MDI), 4,4'-methylenebis(3-methoxy phenyl isocyanate), isophorone diisocyanate (IPDI) 1,5-naphthalene diisocyanate (NDI), phenylene-1, 4-diisocyanate, toluene diisocyanate (TDI), m-xylene diisocyanate (XDI), 1,4-cyclohexyl diisocyanate (CHDI), 1,10-diisocyanatonaphthylene, and 4,4'-methylenebis-(cyclohexyl isocyanate) ($H_{12}$ MDI). The most preferred diisocyanate is MDI.

Preferred TPU-IDP compositions thus contain a polyether intermediate which is polyethyleneoxide glycol, a diisocyanate which preferably is MDI and a chain extender which preferably is butane diol. Preferred TPU-IDP compositions are also set forth in U.S. Pat. No. 5,574,104 which is hereby fully incorporated by reference.

The TPU-IDP compositions can contain a small amount of a salt such as an electrostatic dissipating agent and such compositions are generally preferred. The salt can generally be added to any existing TPU-IDP composition such as those set forth herein above which is hereby fully incorporated by reference.

Accordingly, it is an important aspect of the present invention to utilize an effective amount of a salt, a salt complex or a salt compound formed by the union of a metal ion with a non-metallic ion or molecule. These salts are preferably added during the one-shot polymerization process. While the exact mechanism of attachment and/or attraction of the salt to the TPU-IDP reaction product is not completely understood, the salt unexpectedly improves the surface and volume resistivities of the resulting polymer without the presence of unacceptably high levels of extractable anions. Moreover, the static decay times remain in an acceptable range. Examples of salts useful in the subject invention include but are not limited to: $LiClO_4$, $LiN(CF_3SO_2)_2$, $LiPF_6$, $LiAsF_6$, LiI, LiBr, LiSCN, $LiSO_3CF_3$, $LiNO_3$, $LiC(SO_2CF_3)_3$, $Li_2$ S, and $LiMR_4$ where M is Al or B, and R is a halogen, alkyl or aryl group. The preferred salt is $LiN(CF_3SO_2)_2$, which is commonly referred to as lithium trifluoromethane sulfonimide. The effective amount of the selected salt added to the one-shot polymerization is at least about 0.10 parts to about 10 parts by weight based on 100 parts by weight of the TPU-IDP composition, desirably at least about 0.25 parts to about 7 parts by weight and preferably at least about 0.75 parts to about 5 parts by weight.

In accordance with another important feature of the present invention, it has been discovered that the amount of salt utilized can be unexpectedly lowered when the salt is added in conjunction with an effective amount of a co-solvent and that lower surface and volume resistivities are obtained. That is, the polyether polyol intermediate is considered to be a solvent. Examples of co-solvents suitable for this purpose include but are not limited to ethylene carbonate, propylene carbonate, dimethyl sulfoxide, tetramethylene sulfone, tri- and tetra ethylene glycol dimethyl ether, gamma butyrolactone, and N-methyl-2-pyrrolidone. Ethylene carbonate is preferred. Although the addition of one of the co-solvents is optional, in some applications lower amounts of the salt may be desirable. The effective amount of co-solvent required to achieve the desired result of lower salt usage while still attaining the desired properties in the TPU-IDP, is at least about 0.10 parts to about 20 parts by weight based on 100 parts of the TPU-IDP, preferably at least about 0.50 parts to about 15 parts, and most preferably at least about 1.0 parts to about 7 parts by weight.

The TPU-IDP composition also has small amounts of impurities such as anions therein. For example the total amount of extractable anions of chlorine anions, nitrate anions, phosphate anions; and sulfate anions, is generally less than about 8,000 parts, desirably less than about 7,000 parts, and preferably less than about 6,000 parts by weight per one billion total parts by weight of total extractable solution; generally the parts by weight of extracted chlorine anions per billion parts by weight of total extractable solution is less than about 1,000 parts, desirably less than about 700 parts, and preferably less than about 350 by weight; generally the parts by weight of extractable nitrate ions per billion parts by weight of extractable solution is less than about 100 parts, desirably less than about 90 parts, and preferably less than about 75 parts by weight; generally the parts by weight of extractable phosphate ions per billion parts by weight of extractable solution is less than about 6,000 parts, desirably less than about 5,500 parts, and preferably less than about 5,000 parts by weight; and generally the parts by weight of extractable sulfate ions per billion parts by weight of extractable solution is less than about 1,000 parts, desirably less than about 750 parts, and preferably less than about 500 parts by weight per billion parts by weight. The extractable ions, etc., was determined by placing an 8×2 cm sample in 10 ml of water for 60 minutes at 80° C. The ion content was analyzed via ion chromatography. Hence, the above results are reported by parts per billion per total extracted water.

The use of lithium salts either alone or in association with a solvent is described in detail in U.S. Pat. No. 6,140,405 which is hereby fully incorporated by reference.

The electrostatic dissipative compositions of the present invention which preferably are thermoplastic urethanes have good surface resistivity and volume resistivity as measured by ASTM D-257 For example, the above TPU-IDP compositions whether or not they contain a lithium salt generally have a surface resistivity of from about $1\times10^6$ to about $1\times10^{12}$ ohm/square, desirably from about $1\times10^7$ to about $1\times10^{11}$ ohm/square and preferably from about $1\times10^8$ to about $1\times10^{10}$ ohm/square and a volume resistivity of from about $1\times10^6$ to about $1\times10^{12}$ ohm-centimeter, desirably from about $1\times10^7$ to about $1\times10^{11}$ ohm-centimeter and preferably from about $1\times10^9$ to about $5\times10^{10}$ ohm-centimeter.

IDP polymers other than TPU-IDP, as described above, may be used in the blends of this invention. IDP polymers such as polyether amides (commercially available as Pebax® from Atofina), polyether esters, copolymers of ethylene oxide and propylene oxide, and copolymers of ethylene oxide and epichlorohydrin may be used. The most preferred IDP is a TPU-IDP as described above, especially if a transparent blend is desired.

COC

The cycloolefin copolymers of the present invention are prepared by polymerizing from 0.1% to 99.9% by weight, based on the total amount of the monomers, of at least one polycyclic olefin of the formula I and/or II

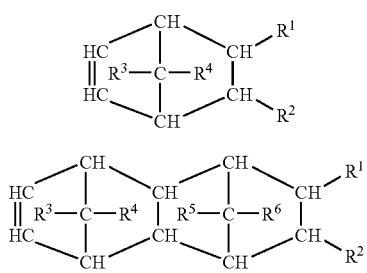

where each $R^1$, $R^2$, $R^3$, $R^4$, $R^5$, and $R^6$ are identical or different and are a hydrogen atom or a hydrocarbon radical, where the same radicals in the different formulae may have a different meaning; and from 0.1 to 99% by weight, based on the total amount of the monomers, of at least one acyclic 1-olefin of the formula III

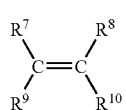

wherein each $R^7$, $R^8$, $R^9$ and $R^{10}$ are identical or different and are a hydrogen atom or a hydrocarbon radical, preferably a $C_6$-$C_{10}$-aryl radical or a $C_1$-$C_8$ alkyl radical, with ethylene or propylene being preferred.

Preference is given to cycloolefins of the formulae I or II where each $R^1$, $R^2$, $R^3$, $R^4$, $R^5$, $R^6$ are identical or different and are a hydrogen atom or a hydrocarbon radical, in particular a ($C_6$-$C_{10}$)-aryl radical or a ($C_1$-$C_8$)-alkyl radical, where the same radicals in the different formulae may have a different meaning.

Particularly preferred polycyclic olefins are norbornene and tetracyclododecene, where these can optionally have $C_1$-$C_6$-alkyl substitution. They are preferably copolymerized with ethylene.

The amount of the one or more acyclic one-olefin monomers is generally from about 0.1% to about 99%, desirably from about 45% to about 85%, more desirably from about 55% to about 80%, and preferably from about 60% to about 70 mole % based upon the total number of moles of said one or more acyclic one-olefin monomers and said one or more polycyclic olefin monomers of Formulas I and/or II.

The novel polymer blend is characterized in that the cycloolefin copolymer(s) present are prepared by the process described below. The process for preparing the cycloolefin copolymers present in the novel polymer blend is described in detail in DE-A-196 52 340, which is expressly incorporated herein by way of reference.

The process according to the invention for preparing a cycloolefin copolymer encompasses the polymerization of at least one polycyclic olefin monomer with at least one acyclic 1-olefin, in the presence of a catalyst system. The catalyst system to be used for preparing the cycloolefin copolymer present in the novel polymer blend comprises at least one transition metal compound. Preference is given to the use of one or more metallocenes as transition metal compound.

The polymerization is carried out in the liquid cycloolefin itself or in a cycloolefin solution. The pressure is usually above 1 bar.

The catalyst system to be used in preparing the cycloolefin copolymer present in the novel polymer blend may moreover comprise one or more cocatalysts.

The catalyst system to be used for preparing the cycloolefin copolymer present in the novel polymer blend is a high-activity catalyst for olefin polymerization. Preference is given to using a metallocene and a cocatalyst. It is also possible to use mixtures of two or more metallocenes, particularly for preparing reactor blends or polyolefins with a broad or multimodal molar mass distribution.

The process for preparing the cycloolefin copolymer present in the novel polymer blend, and also the catalyst system to be used for this process, are described in detail in DE-A-1 96 52 340, which is expressly incorporated herein by way of reference.

The cocatalyst present in the catalyst system to be used for preparing the cycloolefin copolymer present in the novel polymer blend preferably comprises an aluminoxane.

Examples of the metallocenes to be used according to the invention are: isopropylene(1-indenyl)(3-isopropylcyclopentadienyl)zirconium dichloride, diphenylmethylene(1-indenyl)(3-isopropylcyclopentadienyl)zirconium dichloride, methylphenylmethylene(1-indenyl)(3-isopropylcyclopentadienyl)zirconium dichloride, isopropylene(1-indenyl)(3-tert-butylcyclopentadienyl)zirconium dichloride, diphenylmethylene(1-indenyl)(3-tert-butylcyclopentadienyl)zirconium dichloride, methylphenylmethylene(1-indenyl)(3-tert-butylcyclopentadienyl)zirconium dichloride, isopropylene(4,5,6,7-tetrahydro-1-indenyl)(3-isopropylcyclopentadienyl)-zirconium dichloride, diphenylmethylene(4,5,6,7-tetrahydro-1-indenyl)(3-isopropylcyclopentadienyl)zirconium dichloride, methylphenylmethylene(4,5,6,7-tetrahydro-1-indenyl)(3-isopropylcyclopentadienyl)zirconium dichloride, isopropylene(1-indenyl)(3-trimethylsilylcyclopentadienyl)zirconium dichloride, diphenylmethylene(1-indenyl)(3-trimethylsilylcyclopentadienyl)zirconium dichloride, methylphenylmethylene(1-indenyl)(3-trimethylsilylcyclopentadienyl)-zirconium dichloride, isopropylene(4,5,6,7-tetrahydro-1-indenyl)(3-tert-butylcyclopentadienyl)-zirconium dichloride, diphenylmethylene(4,5,6,7-tetrahydro-1-indenyl)(3-tert-butylcyclopentadienyl)-zirconium dichloride, methylphenylmethylene(4,5,6,7-tetrahydro-1-indenyl)(3-tert-butylcyclopentadienyl)zirconium dichloride, isopropylene(4,5,6,7-tetrahydro-1-indenyl)(3-trimethylsilylcyclopentadienyl)-zirconium dichloride, diphenylmethylene(4,5,6,7-tetrahydro-1-indenyl)(3-trimethylsilylcyclopentadienyl) zirconium dichloride, methylphenylmethylene(4,5,6,7-tetrahydro-1-indenyl)(3-trimethylsilylcyclopentadienyl) zirconium dichloride.

Another possible embodiment of the process according to the invention uses a salt-type compound of the formula $R_xNH_{4-x}BR'_4$ or of the formula $R_3PHBR'_4$ as cocatalyst instead of or in addition to an aluminoxane.

Here, x=1, 2 or 3, R=alkyl or aryl, identical or different, and R'=aryl, which may also have been fluorinated or partially fluorinated. In this case the catalyst is composed of the reaction product of a metallocene with one of the compounds mentioned (EP-A-0 277 004).

Any solvent added to the reaction mixture is a common inert solvent, such as an aliphatic or cycloaliphatic hydrocarbon, a gasoline fraction or hydrogenated diesel oil fraction, or toluene.

The metallocenes are preferably used in the form of their racemates. The metallocene is preferably used at a concentration, based on the transition metal, of from $10^{-1}$ to $10^{-8}$ mol, preferably from $10^{-2}$ to $10^{-7}$ mol, particularly preferably from $10^{-3}$ to $10^{-7}$ mol, of transition metal per $dm^3$ of reactor volume. The aluminoxane is used at a concentration of from $10^{-4}$ to $10^{-1}$ mol, preferably from $10^{-4}$ to $2.10^{-2}$ mol, per dm$^3$ of reactor volume, based on the aluminum content. In principle, however, higher concentrations are also possible.

While the cycloolefin copolymers can have glass transition temperatures of up to 250° C., preferably they have a processing temperature range such that it is compatible with the TPU polymer or the TPU-IDP polymer. Suitable cycloolefin copolymers for blending with a TPU or TPU-IDP polymer generally have a Tg of from about minus 25° C. to about 150° C., desirably from about 50° C. to about 125° C., and preferably from about 60° C. to about 115° C.

The COCs suitable or the purposes of the invention have viscosity numbers (determined in decalin at 135° C.) of from 25 to 200 ml/g, preferably from 40 to 120 ml/g, particularly preferably from 40 to 100 ml/g.

The cycloolefin copolymers have a particular structure, which has been described in detail in a dissertation by J. Ruchatz, Dusseldorf 1997.

Accordingly, the cycloolefin copolymers present in the novel polymer blend may have sequences of two norbornene units incorporated one after the other. Two norbornene units also correspond to the maximum possible sequence length of the cycloolefin copolymers present in the novel polymer blend.

The amount of the cycloolefin copolymer is generally from about 45% to about 90% by weight, desirably from about 60% to about 85% by weight, and preferably from about 70% to about 80% by weight based upon the total weight of the one or more cycloolefin copolymers and the one or more TPU, TPU-IDP, and/or other IDP polymers.

As noted above, it is an important aspect of the present invention to produce transparent blends of the cycloolefin polymer and the thermoplastic urethane. Accordingly, a cycloolefin copolymer is utilized which generally has an index of refraction of from about 1.48 to about 1.58, desirably from about 1.50 to about 1.56 and preferably from about 1.52 to about 1.54. The TPU and/or TPU-IDP have a similar index or refraction so that the blend is transparent. Generally, the index of the refraction of these two components are similar and the difference between them is thus are less than about 0.05, desirably less than about 0.03, and preferably less than about 0.01. As also noted above, the TPU component or the TPU-IDP component has an index of refraction of generally from about 1.48 to about 1.58, desirably from about 1.50 to about 1.56, and preferably from about 1.52 to about 1.54. The light transmission of the transparent blend for a 125 mil plaque is desirably greater than 50%, and preferably greater than 75% as measured according to ASTM D-1003-61.

Suitable cycloolefin copolymers (COC) are commercially available under the name Topas® from Ticona GmbH. The proper selection of the particular grade of COC will depend on the IDP polymer being blended with the COC. To obtain a clear blend, the index of refraction of the COC should be similar to the IDP polymer used. Also, the melt processing temperatures should be close enough to achieve proper intimate blending of the polymers. The proper selection of the COC is determinable by one skilled in the art of polymers compounding without undue experimentation. Additionally, the properties of the COC phase and thus the properties of the present invention can be tailored as needed by combining COC resins that have different thermal and rheological properties. Since the COC resins are miscible, properties such as glass transition temperature and viscosity can be moved by adjusting their proportions.

Compatibilizing Agent

The blends of the present invention comprise the thermoplastic polyurethane (TPU) such as an inherently dissipative thermoplastic polyurethane (TPU-IDP) composition or polymer, and the cycloolefin copolymer (COC) such as a copolymer of norbornene and an olefin. While the two components have similar processing temperatures and therefore are processable, and also have similar indices of refraction and therefore are transparent, they are generally incompatible and accordingly a compatibilizing agent is utilized to stabilize the blend and to improve properties without eliminating or significantly reducing its clarity.

The preferred compatibilizer to make a clear blend of a COC and a TPU is a thermoplastic polyurethane derived from the reaction of a substantially hydrocarbon intermediate, a diisocyanate, and a chain extender. The hydrocarbon intermediate is a low molecular weight compound or a polymer having hydroxyl (preferred), amine, or carboxylic acid terminal groups thereon. When the substantially hydrocarbon intermediate is not solely a hydrocarbon but, e.g., a polyester, the number of consecutive polymer backbone carbon atoms between a non-carbon atom such as oxygen, is large, i.e., at least 20 carbon atoms, desirably at least 30 carbon atoms, and preferably at least 45 carbon atoms to about 60, or about 75, or about 100 carbon atoms. An example of such a substantially hydrocarbon intermediate, i.e., a long chain polyester polyol Priplast® 3197 from Unichema. Priplast® 3197 is a dimerdiol dimerate prepared from dimerdiol Pripol® 2033 containing at least 36 carbon atoms and a dimer acid containing about 44 carbon atoms. A suitable low molecular weight hydrocarbon intermediate is Pripol® 2033 from Unichema, a 36 carbon atom dimerdiol. However, the intermediate is preferably solely a hydrocarbon intermediate derived from one or more dienes having a total of from 4 to 8 carbon atoms, such as butadiene, isoprene, and the like, with butadiene being preferred. The number average molecular weight of the hydrocarbon intermediate is generally from about 300 or about 500 to about 10,000, desirably from about 1,000 to about 7,500, and preferably from about 2,000 to about 5,000. The hydrocarbon intermediate can be unsaturated but preferably is substantially hydrogenated such that at least 80%, desirably at least about 90% or about 95%, and preferably at least about 98% or about 99%, and even 100% of the carbon-carbon double bonds in the intermediate are saturated. Hydrogenation may be carried out according to any conventional process or manner Such as set forth in U.S. Pat. No. 5,393,843 or 5,405,911, hereby fully incorporated by reference. When butadiene is utilized, the microstructure of the resulting polymer can be largely 1,2 structure or 1,4 structure (e.g., 15 to 85%) with a similar amount (e.g., 35 to 65%) of each generally being preferred.

Examples of hydrocarbon polyols derived from butadiene include the following:

| Identification | Supplier | Description |
| --- | --- | --- |
| Kraton ® Liquid L2203 | Shell | Hydroxyl-terminated polybutadiene, hydrogenated. Approximate micro-structure: 55% 1, 2; 45% 1, 4. |

-continued

| Identification | Supplier | Description |
|---|---|---|
| Polytail ® H | Mitsubishi | Hydroxyl-terminated polybutadiene, hydrogenated. Approximate microstructure: 21% 1, 2; 79% 1, 4. |
| Polytail ® HA | Mitsubishi | Hydroxyl-terminated polybutadiene, hydrogenated. Approximate microstructure: 83% 1, 2; 17% 1, 4. |
| Krasol ® LBH | Kaucuk AG | Hydroxyl-terminated polybutadiene. Approximate microstructure: 65% 1, 2; 35% 1, 4. |
| Liquiflex ® H | Petroflex | Hydroxyl-terminated polybutadiene. Approximate microstructure: 22% 1, 2; 78% 1, 4. |

Kraton® L2203 is preferred in the present invention.

The term "polyol" with respect to a substantially hydrocarbon polyol intermediate is to be understood to mean that while preferably the hydrocarbon has two functional hydroxyl end groups, the same can generally range from about 1.8 to about 2.2 end groups per molecule.

The isocyanates utilized in the present invention are preferably diisocyanates and include aliphatic, cycloaliphatic, aromatic, alkyl-substituted aromatic diisocyanates and the like, as well as mixtures thereof. Such diisocyanates generally have the formula $R(NCO)_n$ where R is an aliphatic, an aromatic, or combinations thereof having a total of from 2 to about 30 carbon atoms with from about 6 or about 8 to about 15 carbon atoms being preferred, and an n is from 2 to about 4 with 2 being highly preferred. Representative examples include ethylene diisocyanate; toluene diisocyanate; methylene bis-(4-phenylisocyanate), that is, MDI; isophorone diisocyanate; hexamethylene diisocyanate; naphthalene diisocyanate; cyclohexylene diisocyanate; diphenylmethane-3,3' dimethoxy-4,4'-diisocyanate, meta-tetramethylxylene diisocyanate (m-TMXD1), paratetramethylxylene diisocyanate (p-TMXD1), m-xylylene diisocyanate (XDI), decane-1,10-diisocyanate, dicyclohexylmethane-4,4'-diisocyanate, as well as combinations thereof, and the like, with MDI being preferred. It is to be understood that isomers of the various diisocyanate can also be used.

The chain extenders can be either diamines, alkanolamines, or preferably diols containing a total of from 2 to about 15 carbon atoms. Examples of chain extenders include ethanolamine, ethylene diamine, ethylene glycol, 1,3-propane diol, 2,3- or 1,4-butane diol, 1,5-pentane diol, 1,6-hexane diol, hydroquinone bis(2-hydroxyethyl)ether, 1,4-cyclohexanediol, diethylene glycol, dipropylene glycol, 1,4-cyclohexanedimethanol, and the like, with 2-butyl-2-ethyl-1,3-propane diol (BEPD) being preferred, and neopentyl glycol being highly preferred.

The amount of the chain extender can be zero (i.e., none) but desirably is from about 3 to about 30 percent by weight and preferably from about 6 to about 25 percent by weight based upon the total weight of chain extender and the substantially hydrocarbon intermediate utilized in the formation of the thermoplastic polyurethane compatibilizer. The amount of the chain extender and intermediate utilized, whether they contain hydroxyl groups, amine groups, etc., is generally an equivalent excess to the amount of diisocyanate utilized. That is, the molar ratio of the diisocyanate to hydrocarbon intermediate and chain extender is generally from about 0.8 to about 1.05 and desirably from about 0.9 to about 1.01.

It is a desirable aspect of the present invention to make the thermoplastic polyurethane compatibilizer by either the random polymerization method wherein the substantially hydrocarbon intermediate, the diisocyanate and the chain extender are all added together at once and polymerized, or by the prepolymer method. The prepolymer method is preferred where the chain extender is not soluble in the intermediate as generally is the case. Thus, the prepolymer method is generally preferred wherein the isocyanate component is first partially or fully reacted with the hydrocarbon intermediate or polyol to form an isocyanate-terminated prepolymer. The same can be achieved by melt-polymerization. The partially or fully formed prepolymer can then be subsequently reacted with the chain extender.

The polymerization of the reactants forming the thermoplastic compatibilizer of the present invention can generally be carried out by melt-polymerization in a substantially solvent-free and preferably completely solvent-free environment. The hydrocarbon intermediate is heated to a temperature of from about 80° C. to about 160° C. The diisocyanate, such as MDI, is added and prepolymer formation commences. After a short period of time, for example a couple or several minutes whereby partial or total prepolymers have been formed, the chain extender is added and the reaction carried out to completion. This method allows ready reaction of the insoluble chain extender such as neopentyl glycol with the diisocyanate inasmuch as neopentyl glycol does not dissolve in the substantially hydrocarbon intermediate.

The formation of the compatibilizer is generally carried out in the presence of small amounts of catalysts such as organo tin catalysts, e.g., stannous octoate, a preferred catalyst; stannous oleate; dibutyl tin dioctoate; dibutyl tin dilaurate; and the like. Other organic catalysts include iron acetylacetonate, magnesium acetylacetonate, and the like. Tertiary organic amine catalysts, such as triethylamine, triethylene diamine, and the like, can also be utilized. The amount of catalyst is generally very small, from about 25 to about 1,000 parts per million and desirably from about 40 to about 500 PPM by weight based upon the total weight of the reactants.

Although various additives and fillers can be utilized as known to the art and to the literature, such as pigments, lubricants, stabilizers, antioxidants, anti-static agents, fire retardants, etc., the same are generally not utilized in the preparation of the compatibilizer.

The thermoplastic polyurethane compatibilizer of the present invention has soft segments as well as hard segments. The soft segments are generally defined as being solely the hydrocarbon portion of the intermediate. The hard segments are defined as everything else, e.g., the reaction of the intermediate terminal group with the diisocyanate and the reaction of the chain extender with the diisocyanate. The preferred compatibilizers of the present invention desirably have high amounts of soft segments such as at least about 25% or about 35% by weight, desirably from about 45% to about 90% by weight, and preferably from about 60% to about 80% by weight based upon the total weight of the thermoplastic polyurethane compatibilizer excluding any additives, fillers, etc.

The thermoplastic polyurethane compatibilizer was prepared by either the random melt polymerization method or the prepolymer method. In the random melt polymerization method, the polyol and chain extender were blended together at about 100° C. to about 150° C. or about 250° C. Diphenylmethanediisocyanate (MDI) was heated separately to about 100° C. to about 150° C. or about 250° C., then mixed with the blend. The reactants were vigorously mixed for 3-4 minutes. The polymer melt was discharged into a cooled, Teflon-coated pan, cured at 70° C. for 1 week, then granulated. In the prepolymer method, the polyol was heated to about 100° C. to about 150° C. or about 250° C. MDI was separately heated to about 100° C. to about 150° C. or about 250° C., then mixed with the polyol and allowed to react for 1-2 minutes. The chain extender was added, and the reaction continued for an additional 1.5-3 minutes. The polymer melt was then treated as described above. The melt index values were obtained by ASTM D-1238.

The essentially hydrocarbon intermediate thermoplastic urethane compatibilizers of the present invention are also described in detail in U.S. Pat. No. 6,054,533 granted Apr. 25, 2000, and is hereby fully incorporated by reference.

When using TPU and/or TPU-IDP polymers in the blend with COC to achieve a transparent blend, other compatibilizing agents can also be utilized but are generally not preferred inasmuch as they result in a lower clarity and transmission of light. Such less desired compatibilizers are known to the literature and to the art and include block copolymers of styrene-butadiene-styrene commercially available from Shell Chemical as KRATON®. Other compatibilizing agents of the various maleic anhydride grafted polyolefins such as polypropylene-g-maleic anhydride and polyethylene-g-maleic anhydride. The proper selection of the compatibilizing agent will depend on the transparency desired in the blend. The less desired compatibilizers mentioned above may be used in a COC blended with TPU or TPU-IDP if less transparency is desired. The above mentioned less desired compatibilizers can also be used with COC blended with non TPU based IDPs.

The amount of the one or more compatibilizing agents of the present invention is generally low such as from about 0.1 to about 12 parts by weight, desirably from about 0.25 to about 8 parts by weight and preferably from about 0.5 to about 2 or 3 parts by weight for every 100 parts by weight of the one or more thermoplastic urethanes TPUs, and/or TPU-IDPs, and/or other IDP polymers and the one or more cycloolefin copolymers, COC.

Transparent-Clear Blends

As mentioned above, the COC may be blended with a TPU, TPU-IDP or other IDP polymer, and a compatibilizing agent. The clarity of the blends will depend on the proper selection of the COC to match the properties of the other polymers in the blend. Since the most preferred blends are COC blended with TPU and/or TPU-IDP, a clear blend is described below. The transparent or clear blends or alloys of the present invention are made by melt compounding the three components, i.e. the TPU and/or TPU-IDP, the COC and the compatibilizing agent, in any suitable blender such as a Banbury® or as in a twin screw extruder at temperatures of from about 150° C. to about 250° C. and desirably from about 190° C. to about 220° C.

Optical properties are measured by ASTM D-1003 and include light transmission and haze values. Generally, thermoplastic compositions are utilized which have a light transmission of at least about 65% or about 70%, desirably at least about 75% or about 80% and preferably at least about 82%. Suitable haze values are generally about 32% and less, desirably about 27% or about 22% and less, and preferably about 8% or about 5% and less. Better optical properties are obtained when the TPU is not a TPU-IDP. Conversely, better electrostatic dissipating properties are obtained when an TPU-IDP is utilized.

While stabilizers can be utilized, desirably various additives such as antioxidants, UV inhibitors, lubricants, flame retardants, and the like are not utilized inasmuch as they reduce light transmission as well as clarity. If such additives are utilized, they generally utilize at less than about 10%, desirably less than about 5%, and preferably less than about 3% by weight and more preferably none, based upon 100 parts by weight of the TPU and/or TPU-IDP and the COC components.

The use of a compatibilizing agent is generally required because the COC and the TPU phases have a positive free energy of mixing and are therefore immiscible. The compatibilized form of the present invention will have several advantages compared to an uncompatibilized control. By reducing the interfacial tension and increasing interfacial adhesion, the compatibilizer helps to stabilize the desired morphology and therefore properties of the blend. A co-continuous morphology is preferred when the goal is to achieve electrical properties through the use of a TPU-IDP. Increased interfacial adhesion improves energy transfer between the phases. This helps prevent delamination or gross phase separation when the blend is subjected the shear forces seen during secondary processes such as injection molding. It also results in increased impact properties and energy to break.

The transparent clear blends of the present invention have several advantages including static dissipative properties, high flexural modulus and strength, good clarity, low extractable ions, and the like. A notable improvement of the blend is that is has low outgassing properties in that as apparent from the data below, very small amounts of gas are emitted. For example, generally less than about 10 µg off-gases/gram sample, desirably less than about 5 µg off-gases/gram sample or about 3 µg off-gases/gram sample and preferably less than about 1 µg off-gases/gram sample. Such gases include toluene, styrene, methyl methacrylate, and the like.

Outgassing is determined by placing a 500 mg sample in a 20 cc vial and heating for 60 minutes at 85 C in a Tekmar® 7000 headspace analyzer. An aliquot of the headspace was then automatically removed and injected into a Hewlett Packard® 5890 Series II GC equipped with a flame ionization detector. A response factor for decane was measured and used to determine the amount of all three organic compounds and the total amount in the headspace. Identification of each compound was by retention time alone. Off gassing amount is reported in µg off-gases/gram sample.

The above combination of properties result in a useful polymeric blend suitable for electronic and semi-conductor packaging, clean room components and articles, hard disc drive components and packaging, optical devices, films, or coatings, and the like. The blend composition can also be utilized in processes including injection molding, extrusion, thermoforming and the like.

The present invention will be better understood by reference to the following examples which serve to illustrate but not to limit the invention.

EXAMPLES

The ingredients set forth in Tables 1 and 2 (Examples A through P) were blended in a Werner Pfleiderer® model ZSK 30 twin screw extruder under the following general conditions:

Rate: 25-35 lbs/hour

Rpm: 175

Temperatures (C):

Zone 1: 165

Zone 2: 175

Zone 3: 185

Zone 4: 190

Zone 5: 190

Zone 6: 185

Die: 170

Amps: 40

Specimens used for physical, electrical, and cleanliness testing were injection molded.

Luminous transmittance % was tested on a Perkin Elmer Model Lambda® 9 Spectrophotometer. 0.125" thick samples were scanned from 400-860 mm at a rate of 240 nm/min. The light source was a Tungsen-halogen lamp. Slit width was 2 nm and the reference sample was air. Percent transmittance is reported at 700 nm.

Optical properties are determined according to ASTM D-1003 and include light transmission and haze values.

Clear compositions were made according to the following recipes shown in Examples A through J wherein the parts listed are by weight. Additional examples are given in Table 2.

TABLE 1

|  | EXAMPLES | | | | |
| --- | --- | --- | --- | --- | --- |
|  | Ex. A | Ex. B | Ex. C | Ex. D | Ex. E |
|  | | | DESCRIPTION | | |
|  | COC 1 | COC 1/ TPU-IDP Alloy w/TPU compatibilizer | COC 2 | COC 2/ TPU-IDP Alloy w/TPU compatibilizer | COC 1/ TPU-IDP Alloy w/Kraton ® FG-1901X |
| FORMULATIONS | | | | | |
| Topas ® 8007 | 100 | 74 | | | 72 |
| Topas ® 9506 | | | 100 | 74 | |
| TPU-IDP | | 25 | | 25 | 25 |
| Estane ® 58315 | | | | | |
| Estane ® 58206 | | | | | |
| Kraton FG 1901X | | | | | 3 |
| TPU-compatibilizer | | 1 | | 1 | |
| Molded Samples | | | | | |
| Plastic Tensile | | | | | |
| ASTM D-882-97 | | | | | |
| Stress @ Yield psi | 9450 | 5810 | 8820 | 5120 | 5200 |
| Elongation @ Yield % | 3.18 | 3.09 | 3.1 | 2.99 | 3.09 |
| Tensile @ Break psi | 4320 | 2860 | 4510 | 510 | 1840 |
| Elongation @ Break % | 6.55 | 37.9 | 18.1 | 30.5 | 51.4 |
| Modulus psi | 394000 | 271000 | 381000 | 247000 | 254000 |
| Energy to break lbs-in | 43.7 | 185 | 109 | 118 | 226 |
| Flex Modulus ASTM D-790-95(.5 in/min) | 397000 | 266000 | 370000 | 232000 | 237000 |
| Notched IZOD impact ASTM D256-93a | 0.43 | 4.8 | 0.5 | 14.2 | 9.8 |
| type of break | Complete | Hinged | Complete | Partial | Hinged |
| Gardner impact (in lbs/in) | 192 | 1664 | 192 | 960 | 832 |
| Type of failure | Brittle | Ductile | Brittle | Ductile | Ductile |
| Glass transition temp. via DSC | 78 C. | | 65 C. | | |
| Molded Plaques | | | | | |
| Surface Resistivity (ohm/sq) | >E12 | 7.80E+09 | >E12 | 7.40E+09 | 7.4E+09 |
| Volume Resistivity (Ohm-cm) | >E12 | 2.60E+10 | >E12 | 2.70E+10 | 2.50E+10 |
| Delamination? | No | No | No | No | No |
| Optical Properties ASTM D-1003 | | | | | |
| Light transmission % | 94.9 | 85 | 93.6 | 86.8 | 76.9 |
| Haze % | 3.6 | 16.2 | 4 | 20.3 | 25.5 |
| Luminous Transmittance (%) | 78.24 | 81.2 | 88.27 | 79.15 | 65.08 |
| ASTM D542 Index of refraction | 1.53 | | 1.53 | | |

TABLE 1-continued

| | Ex. F | Ex. G | Ex. H | Ex I | Ex. J |
|---|---|---|---|---|---|
| | | | DESCRIPTION | | |
| | COC 1/ 58315* Alloy w/TPU compatibilizer | COC 1/ 58206** alloy w/TPU compatibilizer | Estane® 58315 | Estane® 58206 | TPU-IDP |
| FORMULATIONS | | | | | |
| Topas® 8007 | 79 | 79 | | | |
| Topas® 9506 | | | | | |
| TPU-IDP | | | | | 100 |
| Estane® 58315 | 20 | | 100 | | |
| Estane® 58206 | | 20 | | 100 | |
| Kraton FG 1901X | | | | | |
| TPU-compatibilizer | 1 | 1 | | | |
| Molded Samples Plastic Tensile ASTM D-882-97 | | | | | |
| Stress @ Yield psi | 6490 | 6870 | | 4120 | NA |
| Elongation @ Yield % | 3.09 | 3.13 | | 218 | NA |
| Tensile @ Break psi | 3330 | 2090 | 2760 | 3410 | NA |
| Elongation @ Break % | 51.6 | 40.9 | 535 | 396 | NA |
| Modulus psi | 302000 | 330000 | 1940 | 1840 | NA |
| Energy to break lbs-in | 264 | 223 | 901 | 819 | NA |
| Flex Modulus ASTM D-790-95(.5 in/min) | 290000 | 304000 | 3270 | 3760 | NA |
| Notched IZOD impact ASTM D256-93a | 0.97 | 1.1 | NA | NA | NA |
| type of break | Hinged | Complete | NA | NA | NA |
| Gardner impact (in lbs/in) | 1024 | 704 | NA | NA | NA |
| Type of failure | Ductile | Ductile | | | |
| Glass transition temp. via DSC | | | | | |
| Molded Plaques | | | | | |
| Surface Resistivity (ohm/sq) | >E12 | >E12 | >E12 | >E12 | 2.0E+07 |
| Volume Resistivity (Ohm-cm) | >E12 | >E12 | >E12 | >E12 | 1.0E+07 |
| Delamination? | No | No | No | No | No |
| Optical Properties ASTM D-1003 | | | | | |
| Light transmission % | 93 | 94.3 | 94.11 | 89.56 | 61.1 |
| Haze % | 11.9 | 6.6 | 5.04 | 16.91 | 12.7 |
| Luminous Transmittance (%) | 85.66 | 86.50 | 89.54 | 85.25 | 79.57 |
| ASTM D542 Index of refraction | | | 1.53 | 1.53 | 1.53 |

*58315 is an ether based TPU commercially available from Noveon. Inc.
**58206 is an ester based TPU commercially available from Noveon. Inc.

The data in Table 2 show two commercially known IDP alloys (Examples K and L). Examples M, N and O show different levels of TPU-IDP blended with cycloolefin copolymer and a TPU compatibilizer. Example P is a COC/TPU-IDP blend without a TPU compatibilizer. The molding results show that the TPU compatibilizer is necessary to prevent delamination for high shear processing, such as molding. Delamination is indictive of a lack of compatibility in polymer blends. Low shear processing, such as often occurs in extrusion, is not as prone to show delamination.

TABLE 2

| | EXAMPLES | | | | | |
|---|---|---|---|---|---|---|
| | Ex. K | Ex. L | Ex. M | Ex. N | Ex. O | Ex. P |
| | | | DESCRIPTION | | | |
| | Acrylic IDP alloy | Acrylic core/shell IDP | COC 1/TPU-IDP Alloy w/TPU compatibilizer | COC 1/TPU-IDP Alloy w/TPU compatibilizer | COC 1/TPU/IDP Alloy w/TPU compatibilizer | COC/TPU-IDP Blend |
| FORMULATIONS | | | | | | |
| Topas ® 8007 | | | 79 | 71.5 | 64 | 75 |
| Topas ® 9506 | | | | | | |
| TPU-IDP | | | 20 | 27.5 | 35 | 25 |
| TPU-compatibilizer | | | 1 | 1 | 1 | |
| ClearStat ® C-37 | 100 | | | | | |
| Bayon ® YM-312 | | 100 | | | | |
| Molded Samples Plastic Tensile ASTM D-882-97 | | | | | | |
| Stress @ Yield psi | | | 5990 | 4580 | 3590 | 5200 |
| Elongation @ Yield % | | | 3.11 | 3.56 | 5.86 | 3.05 |
| Tensile @ Break psi | | | 1050 | 1870 | 3000 | 4420 |
| Elongation @ Break % | | | 27.3 | 21.7 | 16.9 | 8.71 |
| Modulus psi | | | 311000 | 245000 | 186000 | 275000 |
| Energy to break lbs-in | | | 124 | 74.6 | 66.3 | 47 |
| Flex Modulus ASTM D-790-95 (.5 in/min) | | | 265000 | 189000 | 146000 | 247000 |
| Notched IZOD impact ASTM D256-93a | | | 12.1 | 12.5 | 2.3 | 5 |
| type of break | | | | | | |
| Gardner impact (in lbs/in) | | | | | | 320 |
| Type of failure | | | | | | Ductile |
| Molded Plaques | | | | | | |
| Surface Resistivity (ohm/sq) | | | 2.5E+10 | 3.70E+09 | 6.90E+08 | 2.2E+10 |
| Volume Resistivity (Ohm-cm) | | | 4.9E+10 | 7.40E+09 | 8.30E+08 | 5.4E+10 |
| Delamination? | No | No | No | No | No | Yes |

The data in Table 3 below is presented to show the low offgassing of compositions of this invention as compared to two other commercially available transparent inherently dissipative polymers. The low offgassing features of the present invention are important in electronic applications to avoid damaging the electronic components. The table below shows offgassing results for Example B of the present invention and two alternate transparent, static dissipative polymers. The composition of Example B is shown in Table 1. Example K (comparative) is a blend of an acrylic based polymer and a polyether amide based IDP. It is commercially available from Cyro Industries under the tradename ClearStat® C-37. Example L (comparative) is an inherently dissipative acrylic polymer made by a core/shell process. It is commercially available from Kureha under the tradename Bayon®. Example B shows lower total outgassing and lower outgassing of each identified species. The formulations for Examples K and L are shown in Table 2.

TABLE 3

| Off Gassing component (μg/g) | EXAMPLE B | EXAMPLE K (Comparative) | EXAMPLE L (Comparative) |
|---|---|---|---|
| Methyl Methacrylate | <0.03 | 12.65 | 1.91 |
| Toluene | <0.02 | 75.77 | 0.08 |
| Styrene | <0.02 | 7 | 0.15 |
| Total including unknowns | 1.32 | 99.4 | 11.54 |

Topas is a copolymer of ethylene and norbornene made by Ticona GmbH. The TPU-IDP, made by Noveon Inc., is a TPU derived from a polyethylene oxide intermediate, MDI, and butane diol as a chain extender with a small amount of a lithium salt and prepared according to U.S. Pat. No. 6,140,405.

Kraton® FG-1901X is a maleated styrene-ethylene/butylene-styrene triblock copolymer (SEBS-MA). It contains 28% polystyrene by weight and 2% maleic anhydride.

TPU compatibilizer is a compatibilizer derived from a polybutadiene intermediate, MDI, and a neopentyl glycol chain extender and made according to U.S. Pat. No. 6,054,533.

As apparent from Table 1, improved optical properties are obtained when non-electrostatic dissipating thermoplastic urethanes are utilized, see Examples F and G. However, when a TPU-IDP is utilized as in Examples B and D, optical properties drop off but favorable surface resistivity and volume resistivity values are obtained which are not too conductive and not too resistant. Examples M, N, and O (Table 2) demonstrate the effect of TPU-IDP level on surface and volume resistivity. Resistivity decreases with increasing level of TPU-IDP. Values can be adjusted to the desired level within the static dissipative range. Tensile strength and modulus values decrease with increasing TPU-IDP level.

Improved impact properties (Gardner and notched izod) were also obtained when compared to the COC whether or not a TPU-IDP was utilized.

While in accordance with the Patent Statutes the best mode and preferred embodiment have been set forth, the scope of the invention is not limited thereto but rather by the scope of the attached claims.

What is claimed is:

1. A clear thermoplastic composition comprising: a blend of cycloolefin copolymer and a thermoplastic polyurethane and a compatibilizing agent, wherein said compatibilizing agent comprises a thermoplastic polyurethane derived from a diisocyanate, a diol, and a substantially hydrocarbon intermediate containing at least 20 carbon atoms between non-carbon atoms in the intermediate backbone, or said intermediate is derived from one or more dienes having a total of from 4 to 8 carbon atoms.

2. A clear thermoplastic composition according to claim 1, including a compatibilizing agent, wherein said compatibilizing agent comprises a thermoplastic polyurethane derived from a diisocyanate, a diol, and a substantially hydrocarbon intermediate containing at least 20 carbon atoms between non-carbon atoms in the intermediate backbone, or said intermediate is derived from one or more dienes having a total of from 4 to 8 carbon atoms, wherein at least 80% of the initial carbon to carbon double bonds in said intermediate have been saturated, wherein said diisocyanate is selected from the group consisting of ethylene diisocyanate; toluene diisocyanate; methylene bis-(4-phenylisocyanate) (MDI); isophorone diisocyanate; hexamethylene diisocyanate; naphthalene diisocyanate; cyclohexylene diisocyanate; diphenylmethane-3,3' dimethoxy-4,4'-diisocyanate, meta-tetramethylxylene diisocyanate (m-TMXD1), paratetramethylxylene diisocyanate (p-TMXD1), m-xylylene diisocyanate (XDI), decane-1,10-diisocyanate, dicyclohexylmethane-4,4'-diisocyanate, and combinations thereof, and wherein said diol is selected from the group consisting of ethylene glycol, 1,3-propane diol, 2,3- or 1,4-butane diol, 1,5-pentane diol, 1,6-hexane diol, hydroquinone bis(2-hydroxyethyl)ether, 1,4-cyclohexanediol, diethylene glycol, dipropylene glycol, 1,4-cyclohexanedimethanol, and combinations thereof.

3. A clear thermoplastic composition according to claim 1, including from about 0.25 to about 8 parts by weight of a compatibilizing agent per 100 parts by weight of said thermoplastic urethane and said cycloolefin copolymer, wherein said compatibilizing agent comprises a thermoplastic polyurethane having a hydrocarbon intermediate derived from one or more dienes having a total of from 4 to 8 carbon atoms wherein at least 90% of the initial carbon to carbon double bonds have been saturated, wherein said diisocyanate is MDI, and wherein said diol is neopentyl glycol.

4. An electrostatic dissipating thermoplastic composition comprising:
(a) a cycloolefin copolymer, wherein said cycloolefin copolymer is derived from at least one polycyclic olefin monomer and at least one acyclic 1-olefin monomer, said polycyclic olefin monomer having the formula

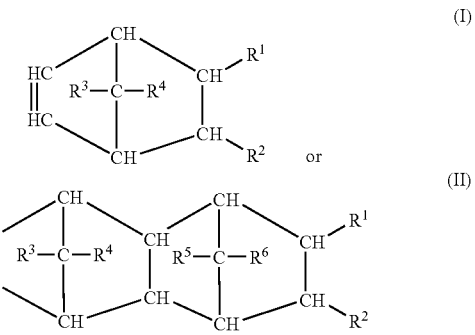

wherein each $R^1$, $R^2$, $R^3$, $R^4$, $R^5$, and $R^6$, independently, are the same or different, and is a hydrogen atom or a hydrocarbon radical, and wherein said acylic 1-olefin has the formula

wherein each $R^7$, $R^8$, $R^9$, and $R^{10}$, independently, are the same or different, and is a hydrogen atom or a $C_6$-$C_{10}$ aryl group or a $C_1$-$C_8$ alkyl group, and wherein said electrostatic dissipating composition has a surface resistivity of from about $1\times10^6$ to about $1\times10^{12}$ ohm/square; and (b) an electrostatic dissipating thermoplastic composition, wherein said electrostatic dissipating thermoplastic composition comprises a thermoplastic polyurethane derived from one or more cyclic ether monomers, at least one diisocyanate, and at least one diol, wherein said cyclic ether monomer has the formula

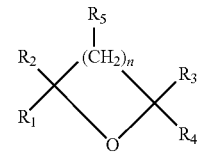

wherein each $R_1$, $R_2$, $R_3$, $R_4$, and $R_5$, independently, is a hydrogen atom, an unsubstituted or substituted alkyl, cycloalkyl, cycloalkenyl, aryl, aralkyl or alkaryl, and wherein said substituents which can be substituted within the foregoing are $OR_6$, $SR_6$, CN or a halogen, where $R_6$ is hydrogen, alkyl, cycloalkyl, cycloalkenyl, aryl, aralkyl, alkaryl, or carboxyl, and n is 0, 1, 2, or; and (c) a compatibilizing agent, wherein said compatibilizing agent comprises a thermoplastic polyurethane derived from a diisocyanate, a diol, and a substantially hydrocarbon intermediate containing at least 20 carbon atoms between non-carbon atoms in the intermediate backbone or a hydrocarbon intermediate derived from one or more dienes having a total of from 4 to 8 carbon atoms.

5. An electrostatic dissipating thermoplastic composition according to claim 4, wherein said cycloolefin copolymer is derived from norbornene or tetracyclododecene, wherein said acylic 1-olefin monomer is ethylene or propylene, wherein said electrostatic dissipating thermoplastic polyurethane cyclic ether monomer is a cycloalkyl having from 3 to 8 ring carbon atoms, wherein said diisocyanate is selected from the group consisting of 1,4-diisocyanatobenzene (PPDI), 4,4'-methylenebis(phenyl isocyanate) (MDI), 4,4'-methylenebis(3-methoxy phenyl isocyanate), isophorone diisocyanate (IPDI) 1,5-naphthalene diisocyanate (NDI), phenylene-1,4-diisocyanate, toluene diisocyanate (TDI), m-xylene diisocyanate (XDI), 1,4-cyclohexyl diisocyanate (CHDI), 1,10-diisocyanatonaphthylene, and 4,4'-methylenebis-(cyclohexyl isocyanate) ($H_{12}$ MDI), and wherein said glycol chain extender is selected from the group consisting of ethylene glycol, 1,3-propanediol, propylene glycol, 1,4-butanediol, 1,3-butanediol, 1,5-pentanediol, 1,6-hexanediol, diethylene glycol, 1,4-cyclohexane dimethanol, neopentyl glycol, hydroquinone bis(2-hydroxyethyl)ether, or combinations thereof.

6. An electrostatic dissipating thermoplastic composition according to claim 5, wherein said cycloolefin copolymer is derived from norbornene and ethylene, wherein the amount of said ethylene monomer is from about 45% to about 85 mole % based upon the total moles of said ethylene and said norbornene monomers, and
wherein said compatibilizing agent diisocyanate is selected from the group consisting of ethylene diisocyanate; toluene diisocyanate; methylene bis-(4-phenylisocyanate) (MDI); isophorone diisocyanate; hexamethylene diisocyanate; naphthalene diisocyanate; cyclohexylene diisocyanate; diphenylmethane-3,3'-dimethoxy-4,4'-diisocyanate, meta-tetramethylxylene diisocyanate (m-TMXD1), paratetramethylxylene diisocyanate (p-TMXD1), m-xylylene diisocyanate (XDI), decane-1,10-diisocyanate, dicyclohexylmethane-4,4'-diisocyanate, and combinations thereof, and wherein said compatibilizing agent diol is selected from the group consisting of ethylene glycol, 1,3-propane diol, 2,3- or 1,4-butane diol, 1,5-pentane diol, 1,6-hexane diol, hydroquinone bis(2-hydroxyethyl)ether, 1,4-cyclohexanediol, diethylene glycol, dipropylene glycol, 1,4-cyclohexanedimethanol, and combinations thereof.

7. An electrostatic dissipating thermoplastic composition according to claim 4, wherein said electrostatic dissipating thermoplastic urethane cyclic ether monomer is ethylene oxide, wherein said diisocyanate is MDI and wherein said diol is butane diol, wherein said electrostatic dissipating thermoplastic polyurethane has a surface resistivity of from about $1 \times 10^8$ to about $1 \times 10^{10}$ ohm/square, and
wherein the amount of said compatibilizing agent is from about 0.25 to about 8 parts by weight per 100 parts by weight of said cycloolefin copolymer and said electrostatic dissipating thermoplastic urethane.

8. An electrostatic dissipating thermoplastic composition according to claim 7, wherein the amount of said ethylene monomer in said cycloolefin copolymer is from about 55 to about 80 mole % based upon the total moles of said ethylene and said norbornene monomers,
wherein said compatibilizing agent intermediate is derived from butadiene, wherein said diisocyanate is MDI and wherein said diol is neopentyl glycol.

9. An electrostatic dissipating thermoplastic composition according to claim 8, wherein said composition comprises co-continuous phases of said cycloolefin copolymer and said electrostatic dissipating thermoplastic urethane.

10. An electronic or semi-conductor packaging material comprising the composition of claim 4.

11. An electronic or semi-conductor packaging material comprising the composition of claim 5.

12. An electronic or semi-conductor packaging material comprising the composition of claim 8.

13. A hard disc drive component or packaging material comprising the composition of claim 4.

14. A hard disc drive component or packaging material comprising the composition of claim 8.

15. A compatibilized polymer blend, comprising:
(a) a cycloolefin copolymer, wherein said cycloolefin copolymer is derived from at least one polycyclic olefin monomer and from at least one acylic 1-olefin monomer and wherein the amount of said acylic 1-olefin monomer is from about 45 to about 85 mole percent based upon the total moles of said acylic 1-olefin monomer and said polycyclic olefin monomer; and
(b) a thermoplastic polyurethane, wherein said thermoplastic polyurethane is derived from a) an intermediate made from an alkylene oxide monomer having from 2 to about 6 carbon atoms or from a polyester intermediate made from a dicarboxylic acid having from 4 to about 15 carbon atoms and from a glycol having from 2 to about 12 carbon atoms, b) a polyisocyanate having the formula $R(NCO)_n$, where n is from about 2 to about 4 and wherein R is an aliphatic, an aromatic, or combinations thereof having a total of from 2 to about 30 carbon atoms, and c) a diol having from 2 to about 10 carbon atoms; and
(c) a compatibilizing agent, wherein said compatibilizing agent comprises a thermoplastic polyurethane derived from a diisocyanate, a diol, and a substantially hydrocarbon intermediate containing at least 20 carbon atoms between non-carbon atoms in the intermediate backbone, or said intermediate is derived from one or more dienes having a total of from 4 to 8 carbon atoms.

16. A compatibilized polymer blend according to claim 15, wherein said polycyclic olefin monomer is norbornene or tetracyclododecene, wherein said acylic 1-olefin monomer is ethylene or propylene;
wherein said alkylene oxide is ethylene oxide or propylene oxide,
wherein said polyester intermediate is derived from an acid selected from the group consisting of succinic acid, glutaric acid, adipic acid, pimelic acid, suberic acid, azelaic acid, sebacic acid, dodecanedioic acid, isophthalic acid, terephthalic acid, cyclohexane acid, and combinations thereof and from a glycol selected from the group consisting of ethylene glycol, propylene-1,2-glycol, 1,3-propanediol, butylene-1,3-glycol, 1,4-butanediol, 1,5-pentanediol, 1,6-hexanediol, 2,2-dimethylpropane-1,3-diol, 2,2-diethylene-1,3-diol, 1,4-cyclohexanedimethanol, decamethylene glycol, dodecamethylene glycol, and combinations thereof;
wherein said thermoplastic polyurethane polyisocyanate is a diisocyanate selected from the group consisting of 4,4'-methylenebis-(phenyl isocyanate) (MDI); isophorone diisocyanate (IPDI), m-xylylene diisocyanate (XDI), toluene diisocyanate, phenylene-1,4-diisocyanate, naphthalene-1,5-diisocyanate, 1,4-cyclohexyl diisocyanate (CHDI), decane-1,10-diisocyanate, diphenylmethane-3,3'-dimethoxy-4,4'-diisocyanate, dicyclohexylmethane-4,4'-diisocyanate, and cyclohexyl-1,4-diisocyanate, or combinations thereof, and wherein said thermoplastic polyurethane diol is selected from the group consisting of ethylene glycol, diethylene glycol, propylene glycol, dipropylene glycol, 1,4-butane diol, 1,6-hexane diol, 1,3-butane diol, 1,5-pentane diol, 1,4-cyclohexane-dimethanol, neopentyl glycol, hydroquinone di(hydroxyethyl)ether and 2-methyl-1,3-propanediol, or combinations thereof; and wherein said compatibilizing agent hydrocarbon intermediate is derived from one or more dienes having a total of from 4 to 8 carbon atoms, wherein at least 80% of the initial carbon to carbon double bonds in said intermediate have been saturated, wherein said compatibilizing agent diisocyanate is selected from the group consisting of ethylene diisocyanate; toluene diisocyanate; methylene bis-(4-phenylisocyanate) (MDI); isophorone diisocyanate; hexamethylene diisocyanate; naphthalene diisocyanate; cyclohexylene diisocyanate; diphenylmethane-3,3' dimethoxy-4,4'-diisocyanate, meta-tetramethylxylene diisocyanate (m-TMXD1), paratetramethylxylene diisocyanate (p-TMXD1), m-xylylene diisocyanate (XDI), decane-1,10-diisocyanate, dicyclohexylmethane-4,4'-diisocyanate, and combinations thereof, and wherein said compatibilizing agent diol is selected from the group consisting of ethylene glycol, 1,3-propane diol, 2,3- or 1,4-butane diol, 1,5-pentane diol, 1,6-hexane diol, hydroquinone bis(2-hydroxyethyl)ether, 1,4-cyclohexanediol, diethylene glycol, dipropylene glycol, 1,4-cyclohexanedimethanol, and combinations thereof.

17. A compatibilized polymer blend according to claim 16, wherein said cycloolefin copolymer is derived from norbornene and from ethylene, wherein the amount of said ethylene is from about 60 to about 70 mole percent based upon the total number of moles of said ethylene and said norbornene;

wherein said thermoplastic polyurethane alkylene oxide is ethylene oxide, wherein said diisocyanate is MDI, and wherein said diol is butane diol; and wherein said compatibilizing agent hydrocarbon intermediate derived from one or more dienes having a total of from 4 to 8 carbon atoms wherein at least 90% of the initial carbon to carbon double bonds have been saturated, wherein said diisocyanate is MDI, and wherein said diol is neopentyl glycol.

* * * * *